(12) United States Patent
Sakata

(10) Patent No.: US 7,423,844 B2
(45) Date of Patent: Sep. 9, 2008

(54) RECORDING DISK DRIVE

(75) Inventor: Masaharu Sakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 689 days.

(21) Appl. No.: 11/139,518

(22) Filed: May 31, 2005

(65) Prior Publication Data

US 2005/0219762 A1   Oct. 6, 2005

Related U.S. Application Data

(63) Continuation of application No. PCT/JP03/07790, filed on Jun. 19, 2003.

(51) Int. Cl.
*G11B 5/54* (2006.01)

(52) U.S. Cl. .................................. 360/256

(58) Field of Classification Search ............ 360/265.1, 360/256, 256.1, 256.2, 256.3, 256.4, 256.5
See application file for complete search history.

(56) References Cited

U.S. PATENT DOCUMENTS

| | | | |
|---|---|---|---|
| 6,252,745 B1 * | 6/2001 | McReynolds et al. | 360/265.1 |
| 6,535,358 B1 * | 3/2003 | Hauert et al. | 360/256.2 |
| 6,731,468 B2 * | 5/2004 | Williams et al. | 360/256 |
| 7,248,441 B2 * | 7/2007 | Chang et al. | 360/265.1 |
| 2003/0086208 A1 * | 5/2003 | Hong et al. | 360/256.1 |

FOREIGN PATENT DOCUMENTS

| | | |
|---|---|---|
| JP | 8-212729 | 8/1996 |
| JP | 2002-313040 | 10/2002 |
| JP | 2003-68038 | 3/2003 |

\* cited by examiner

*Primary Examiner*—Angel A Castro
(74) *Attorney, Agent, or Firm*—Kratz, Quintos & Hanson, LLP

(57) ABSTRACT

A head actuator supports a head slider and designed to swing around a support shaft over first and second swinging ranges adjacent each other. A restraint member is designed to restrain the swinging movement of the head actuator from separating from the first swinging range toward the second swinging range. A restriction member is designed to restrict the swinging movement of the head actuator from separating from the second swinging range toward the first swinging range. The second swinging range is excluded from the actual swinging range of the head actuator when the restraint member operates. The swinging range of the head actuator can thus be reduced or narrowed. Likewise, the first swinging range is excluded from the actual swinging range of the head actuator when the restriction member operates. The swinging range of the head actuator can thus be reduced or narrowed.

17 Claims, 5 Drawing Sheets

RECORDING DISK DRIVE

This application is a continuation of international application PCT/JP03/07790 filed Jun. 19, 2003.

BACKGROUND OF THE INVENTION

1. Field of the Invention

The present invention relates to a recording disk drive designed to manage information based on a recording medium such as a hard disk (HD), for example.

2. Description of the Prior Art

A so-called load/unload mechanism is well known in the technical field of hard disk drives (HDDs). A head suspension is incorporated within a hard disk drive. The head suspension is designed to support a head slider at the tip end. When a magnetic recording disk stops rotating, the head slider moves to a position outside the outer periphery of the magnetic recording disk. The head suspension is supported on a ramp member located at a position outside the magnetic recording disk. The head slider is in this manner prevented from contact with the magnetic recording disk when the magnetic recording disk stays still.

A latch mechanism is disclosed in Japanese Patent Application Publication No. 2002-313040, for example. The latch mechanism is designed to restrain the swinging movement of the head actuator inducing the movement of the head suspension. If an impact is applied to the hard disk drive at rest, the head suspension is reliably held on the ramp member. The head slider is prevented from falling from the ramp member toward the surface of the magnetic recording disk, so that the magnetic head and the magnetic recording disk are prevented from suffering from damages.

The head slider is kept away from the surface of the magnetic recording disk during the rotation of the magnetic recording disk. If a seek error occurs in the hard disk drive, for example, the hard disk drive first operates to move the head slider to a position outside the outermost recording track. The target recording track is subsequently sought again. The head suspension thus slides on the ramp member during the movement of the head slider. The ramp member suffers from abrasion due to the sliding movement of the head suspension. The aforementioned latch mechanism cannot prevent the sliding movement of the head suspension.

SUMMARY OF THE INVENTION

It is accordingly an object of the present invention to provide a recording disk drive capable of suppressing an unnecessary swinging movement of a head actuator.

According to a first aspect of the present invention, there is provided a recording disk drive comprising: a recording disk; a head slider related to the recording disk; a head actuator supporting the head slider and designed to swing around a support shaft over first and second swinging ranges adjacent each other; a restraint member designed to restrain the swinging movement of the head actuator from separating from the first swinging range toward the second swinging range; and a restriction member designed to restrict the swinging movement of the head actuator from separating from the second swinging range toward the first swinging range.

The restraint member serves to keep the head actuator within the first swinging range in the recording disk drive. The second swinging range is excluded from the actual swinging range of the head actuator when the restraint member operates. The swinging range of the head actuator can thus be reduced or narrowed. Likewise, the restriction member serves to keep the head actuator within the second swinging range. The first swinging range is excluded from the actual swinging range of the head actuator when the restriction member operates. The swinging range of the head actuator can thus be reduced or narrowed. In any cases, the swinging movement of the head actuator can be suppressed.

The head slider may be held at a position outside the outermost recording track on the recording disk when the head actuator swings over the first swinging range. In this case, the head slider is kept out of the outermost recording track, so that the head slider is reliably prevented from contacting with the recording disk. On the other hand, the head slider may be held at a position inside the outer periphery of the recording disk when the head actuator swings over the second swinging range. In this case, the head slider cannot move to a position outside the outer periphery of the recording disk. The head slider can be held on or above the recording disk during the rotation of the recording disk.

The restraint member may comprise a stop designed to move along a movement path extending in parallel with the support shaft. The head actuator moves along a plane perpendicular to the support shaft during the swinging movement of the head actuator. The stop may collide against the head actuator along the plane so as to restrain the swinging movement of the head actuator. Since the movement path of the head actuator is set perpendicular to the movement path of the stop, no driving force is applied to the stop along the movement path of the stop even when the head actuator collides against the stop. The stop fails to move.

The restriction member may comprise a stop designed to move along a movement path extending in parallel with the support shaft. The stop may collide against the head actuator along the plane so as to restrain the swinging movement of the head actuator. Since the movement path of the head actuator is set perpendicular to the movement path of the stop, no driving force is applied to the stop along the movement path of the stop even when the head actuator collides against the stop. The stop fails to move. Here, the stop of the restraint member may also serve as the stop of the restriction member. In this case, a collision piece may be fixed to the head actuator. The collision piece is designed to move across the movement path of the stop when the head actuator swings.

The recording disk drive may further comprise: a swinging member designed to swing around a rotation shaft and having an arm member extending in a first direction from the rotation shaft, said swinging member supporting the stop at the tip end of the arm member; a driven piece integral to the swinging member and extending in a second direction opposite to the first direction; and a drive source designed to generate the movement of the driven piece around the rotation shaft.

When the collision piece collides against the stop, the impact of the collision is received on the rotation shaft through the arm member. In this case, no driving force is applied to the stop along the movement path. The stop fails to move. No impact is transmitted to the drive source if the swinging member is prevented from swinging in this manner. The drive source can thus be protected enough from impact of collision. An electromagnetic solenoid may be employed as the drive source, for example. A depression may be formed on the arm member so as to allow the movement of the collision piece between the stop and the rotation shaft.

According to a second aspect of the present invention, there is provided a recording disk drive comprising: a recording disk; a ramp member located at a position outside the recording disk; a head slider related to the recording disk; a head actuator supporting the head slider and designed to swing around a support shaft from a first swinging range, where the head actuator is contacted with the ramp member, to a second swinging range, where the head actuator separates from the ramp member; and a restriction member designed to restrict the swinging movement of the head actuator from separating from the second swinging range toward the first swinging range.

The first swinging range is excluded from the actual swinging range of the head actuator when the restriction member operates. The swinging range of the head actuator can thus be reduced or narrowed. The head slider cannot move to a position outside the outer periphery of the recording disk. The head actuator is prevented from contacting with the ramp member. Abrasion caused by the sliding movement of the head actuator can thus be avoided in the ramp member.

The restriction member may comprise a stop designed to move along a movement path extending in parallel with the support shaft. The stop may collide against the head actuator along the plane so as to restrain the swinging movement of the head actuator. Since the movement path of the head actuator is set perpendicular to the movement path of the stop, no driving force is applied to the stop along the movement path of the stop even when the head actuator collides against the stop. The stop fails to move.

The recording disk drive may further comprise a restraint member designed to restrain the swinging movement of the head actuator from separating from the first swinging range toward the second swinging range. The second swinging range is excluded from the actual swinging range of the head actuator when the restraint member operates. The head slider cannot move to a position inside the outermost recording track. The head slider is prevented from contacting with the recording disk.

The restraint member may comprise a stop designed to move along a movement path extending in parallel with the support shaft. The head actuator moves along a plane perpendicular to the support shaft during the swinging movement of the head actuator. The stop may collide against the head actuator along the plane so as to restrain the swinging movement of the head actuator. Since the movement path of the head actuator is set perpendicular to the movement path of the stop, no driving force is applied to the stop along the movement path of the stop even when the head actuator collides against the stop. The stop fails to move. Here, the stop of the restraint member may also serve as the stop of the restriction member. In this case, a collision piece may be fixed to the head actuator. The collision piece is designed to move across the movement path of the stop when the head actuator swings.

The recording disk drive may further comprise: a swinging member designed to swing around a rotation shaft and having an arm member extending in a first direction from the rotation shaft, said swinging member supporting the stop at the tip end of the arm member; a driven piece integral to the swinging member and extending in a second direction opposite to the first direction; and a drive source designed to generate the movement of the driven piece around the rotation shaft.

When the collision piece collides against the stop, the impact of the collision is received on the rotation shaft through the arm member. In this case, no driving force is applied to the stop along the movement path. The stop fails to move. No impact is transmitted to the drive source if the swinging member is prevented from swinging in this manner. The drive source can thus be protected enough from impact of collision. An electromagnetic solenoid may be employed as the drive source, for example. A depression may be formed on the arm member so as to allow the movement of the collision piece between the stop and the rotation shaft.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
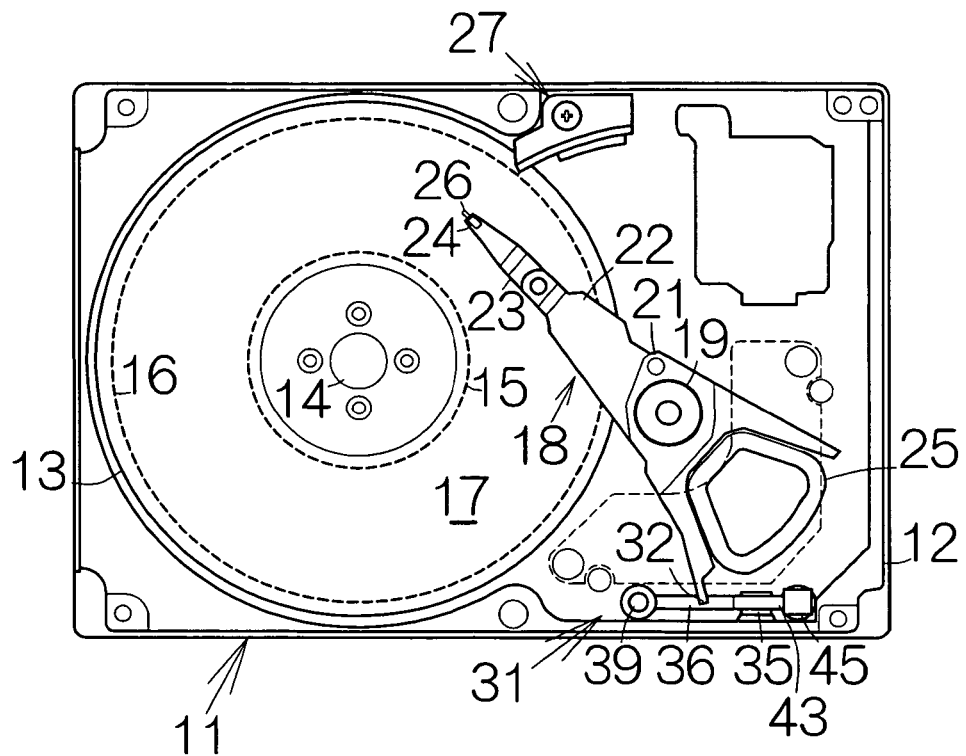
FIG. 1 is a plan view schematically illustrating the structure of a hard disk drive as an example of a recording disk drive according to the present invention.

FIG. 1 schematically illustrates the inner structure of a hard disk drive (HDD) 11 as an example of a recording disk drive or storage device according to a first embodiment of the present invention. The hard disk drive 11 includes a box-shaped main enclosure 12 defining an inner space of a flat parallelepiped, for example. At least one magnetic recording disk 13 as a recording medium is incorporated in the main enclosure 12. The magnetic recording disk or disks 13 is mounted on the driving shaft of a spindle motor 14. The spindle motor 14 is allowed to drive the magnetic recording disk or disks 13 for rotation at a higher revolution speed such as 7,200 rpm, 10,000 rpm, or the like, for example. A cover, not shown, is coupled to the main enclosure 12 so as to define the closed inner space between the main enclosure 12 and the cover itself.

A data zone 17 is defined over the front and back surfaces of the individual magnetic recording disk 13 between an innermost recording track 15 and an outermost recording track 16. Concentric recording circles or tracks are defined within the data zone 17. No magnetic information is recorded on a marginal zone or non-data zone inside the innermost recording track 15. Likewise, no magnetic information is recorded on a marginal zone or non-data zone outside the outermost recording track 16.

A head actuator 18 is also incorporated in the inner space of the main enclosure 12. The head actuator 18 includes an actuator block 21. The actuator block 21 is coupled to a vertical support shaft 19 for relative rotation. Rigid actuator arms 22 are defined in the actuator block 21 so as to extend in the horizontal direction from the vertical support shaft 19. The actuator block 21 may be made of aluminum. Molding process may be employed to form the actuator block 21.

Elastic suspensions 23 are fixed to the corresponding tip ends of the actuator arms 22 so as to further extend in the forward direction from the actuator arms 22. A flying head slider 24 is attached to the tip end of the elastic suspension 23. The flying head slider 24 is cantilevered on the elastic suspension 23 based on the action of a gimbal spring, not shown.

An electromagnetic transducer, not shown, is mounted on the flying head slider 24. The electromagnetic transducer may include a write element and a read element. The write element may include a thin film magnetic head designed to write magnetic bit data into the magnetic recording disk 13 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 13 by utilizing variation in the electric resistance of a spin valve film or a tunnel-junction film, for example.

The elastic suspension 23 serves to urge the flying head slider 24 toward the surface of the magnetic recording disk 13. When the magnetic recording disk 13 rotates, the flying head slider 24 is allowed to receive airflow generated along the rotating magnetic recording disk 13. The airflow serves to generate a positive pressure or lift on the flying head slider 24. The flying head slider 24 is thus allowed to keep flying above the surface of the magnetic recording disk 13 during the rotation of the magnetic recording disk 13 at a higher stability established by the balance between the urging force of the elastic suspension 23 and the lift.

When the head actuator 18 is driven to swing about the vertical support shaft 19 during the flight of the flying head slider 24, the flying head slider 24 is allowed to move along the radial direction of the magnetic recording disk 13. This radial movement allows the electromagnetic transducer on the flying head slider 24 to cross the data zone 17 between the innermost recording track 15 and the outermost recording track 16. The flying head slider 24 can thus be positioned right above a target recording track on the magnetic recording disk 13. A power source 25 such as a voice coil motor (VCM) may be employed to realize the swinging movement of the head actuator 18, for example.

A load tab 26 is attached to the front or tip end of the elastic suspension 23 so as to further extend in the forward direction from the elastic suspension 23. The load tab 26 is allowed to move in the radial direction of the magnetic recording disk 13 based on the swinging movement of the head actuator 18. A ramp member 27 is located at a position outside the magnetic recording disk 13 on the movement path of the load tab 26. The ramp member 27 brings the tip end to a position inside the outer periphery of the magnetic recording disk 13, so that the tip end of the ramp member 27 is opposed to the non-data zone outside the outermost recording track 16. The combination of the load tab 26 and the ramp member 27 establishes a so-called load/unload mechanism as described later in detail. The ramp member 27 may be made of a hard plastic material, for example. Molding process may be employed to from the ramp member 27.

Figure 2:
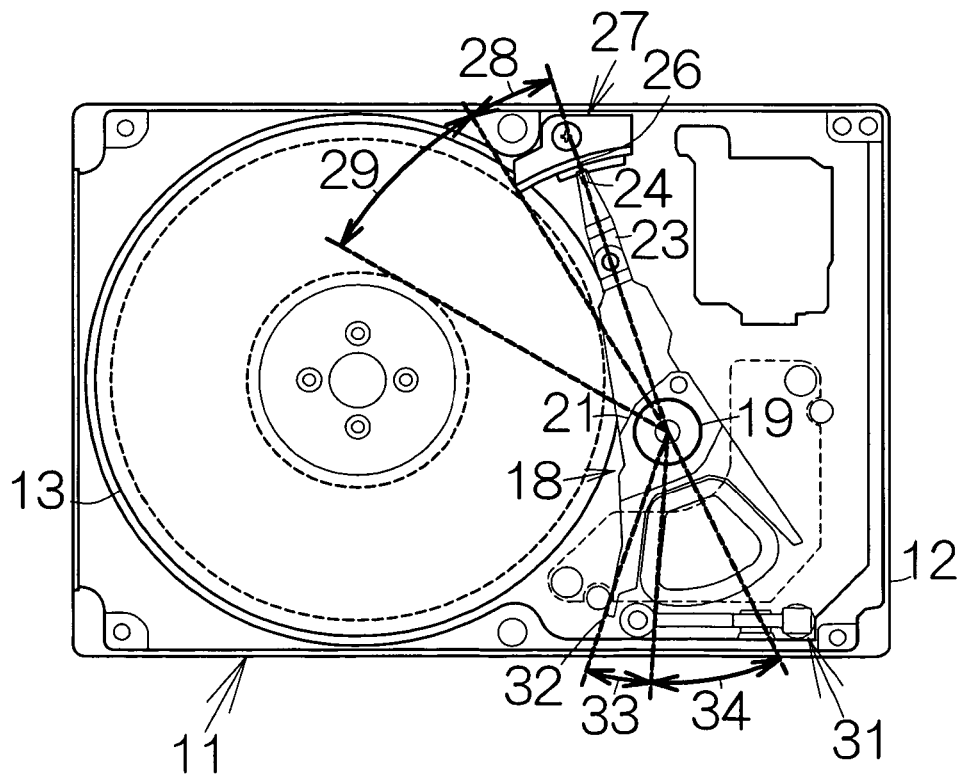
FIG. 2 is a plan view of the hard disk drive for illustrating the swinging range of a head actuator.

As shown in FIG. 2, the swinging range of the head actuator 18 is divided into first and second swinging ranges 28, 29 adjacent each other. When the head actuator 18 is positioned within the first swinging range 28 around the support shaft 19, the load tab 26 is received on the ramp member 27. The flying head slider 24 is kept away from the magnetic recording disk 13 against the urging force from the elastic suspension 23 and the negative pressure caused on the flying head slider 24 by the airflow. The flying head slider 24 is thus prevented from contact with the magnetic recording disk 13 even without generation of a lift on the flying head slider 24. When the head actuator 18 swings within the first swinging range 28, the load tab 26 keeps in contact with the ramp member 27. The flying head slider 24 is maintained at a location at least outside the outermost recording track 16 on the magnetic recording disk 13.

When the head actuator 18 swings around the support shaft 19 from the first swinging range 28 to the second swinging range 29, the load tab 26 takes off from the ramp member 27. The rotating magnetic recording disk 13 serves to generate airflow acting on the flying head slider 24. The flying head slider 24 thus keeps flying above the surface of the magnetic recording disk 13 as described above. The electromagnetic transducer can be positioned right above a target recording track. The write and read operations of magnetic information are effected. When the head actuator 18 swings within the second swinging range 29, the flying head slider 24 is kept at least inside the outer periphery of the magnetic recording disk 13.

A restraint mechanism 31 is related to the head actuator 18. The restraint mechanism 31 includes a collision piece 32 formed on the actuator block 21. The collision piece 32 may extend from the support shaft 19 along the horizontal direction in a direction opposite to the actuator arms 22. When the actuator block 21 swings around the support shaft 19, the collision piece 32 traces an arc orbit around the support shaft 19. When the head actuator 18 swings within the first swinging range 28, the collision piece 32 moves within a first movable range 33. When the head actuator 18 swings within the second swinging range 29, the collision piece 32 moves within a second movable range 34.

Figure 3:
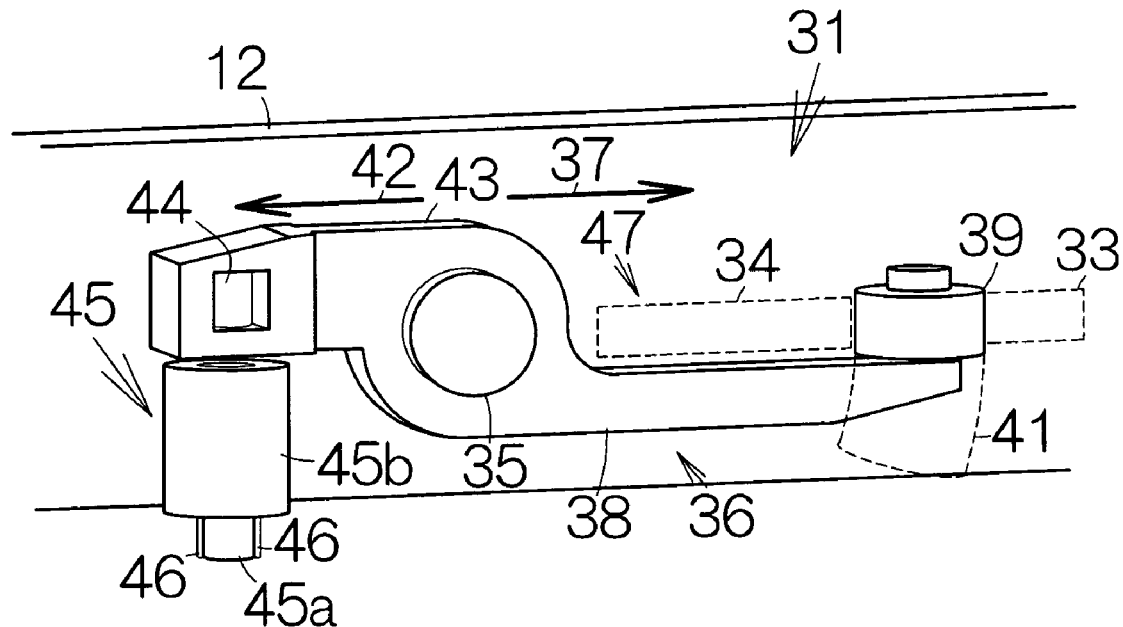
FIG. 3 is an enlarged perspective view schematically illustrating the structure of a restraint mechanism according to a specific example.

As shown in FIGS. 1 and 3, the restraint mechanism 31 further includes a swinging member 36 designed to swing around a rotation shaft 35 extending in the horizontal direction. The rotation shaft 35 may tightly be fitted into a hole defined in the main enclosure 12, for example. A spacer, not shown, may be interposed between the rotation shaft 35 and the inner wall surface of the main enclosure 12.

An arm 38 is formed on the swinging member 36. The arm 38 is allowed to extend along the horizontal direction in a first direction 37 from the rotation shaft 35. A stop 39 is coupled to the tip end of the arm 38. When the swinging member 36 swings around the rotation shaft 35, the stop 39 moves in the vertical direction along an arc orbit around the rotation shaft 35. A movement path 41 of the stop 39 is in this manner established in parallel with the support shaft 19. The movement path 41 of the stop 39 intersects with the first movable range 33 of the collision piece 32. The swinging member 36 may be made of a resin material, for example. Molding process may be employed to form the swinging member 36. The stop 39 may be made of an elastic material such as rubber.

A driven piece 43 is formed on the swinging member 36. The driven piece 43 extends in a second direction 42 opposite to the first direction 37 along the horizontal direction. The driven piece 43 is integral to the swinging member 36. A columnar or prismatic permanent magnet 44 is incorporated in the driven piece 43. The permanent magnet 44 extends in the vertical direction. The magnetization is established in the permanent magnet 44 in the vertical direction. An electromagnetic solenoid 45 as a drive source is related to the permanent magnet 44. The electromagnetic solenoid 45 includes a columnar or prismatic core 45*a*. The core 45*a* is press-fitted into a hole defined in the bottom plate of the main enclosure 12, for example. A coil 45b is wound around the core 45a in the electromagnetic solenoid 45. Lead wires 46 are connected to the coil 45b. The lead wires 46 penetrate through through holes defined in the bottom plate of the main enclosure 12, so that the lead wires 46 are connected to a printed circuit board unit, not shown, located at the back of the hard disk drive 11. Electric power is supplied to the coil 45b through the lead wires 46, 46.

The magnetic flux of the permanent magnet 44 acts on the magnetic body such as the core 45a. Since the core 45a is fixed on the main enclosure 12, the permanent magnet 44 is drawn to the core 45a. The driven piece 43 contacts the core 45a. The stop 39 is thus positioned at the highest position, namely an operating position. The stop 39 is positioned in the first movable range 33 adjacent the second movable range 34. A depression 47 is formed on the arm 38. The depression 47 allows the movement of the collision piece 43 within the second movable range 34.

Figure 4:
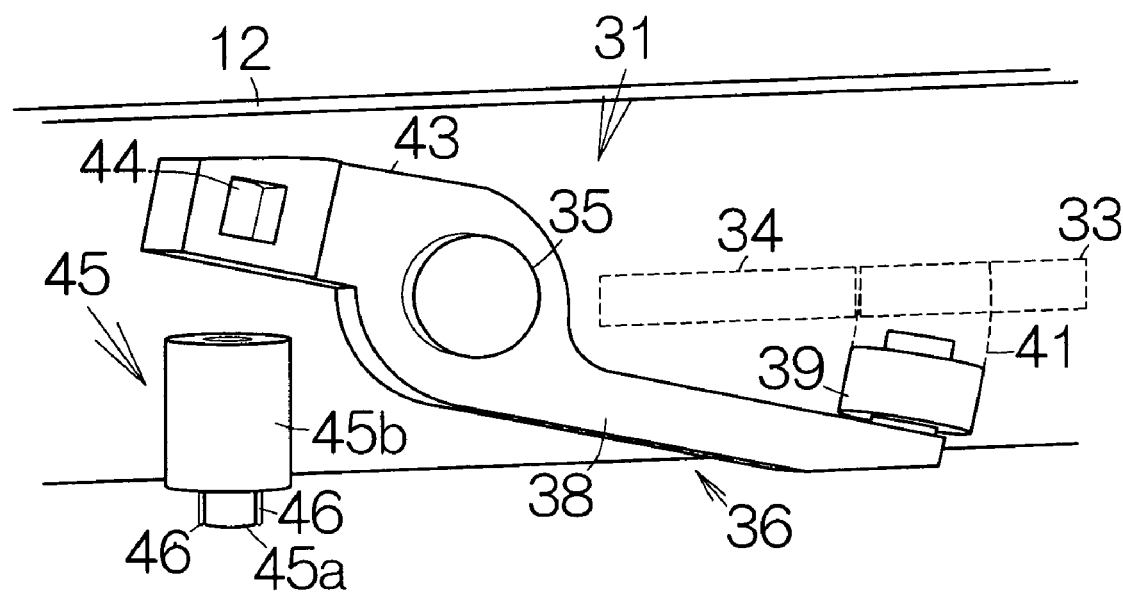
FIG. 4 is an enlarged perspective view schematically illustrating the structure of the restraint mechanism when a stop is positioned out of an operating position.

On the other hand, when electric current is supplied to the coil 45b, a magnetic flux circulates through the coil 45b. The magnetic flux passes through the core 45a. The same magnetic pole is established at opposed positions on the core 45a and the permanent magnet 44, so that the permanent magnet 44 reacts against the core 45a. Since the core 45a is fixed on the main enclosure 12, the permanent magnet 44 along with the driven piece 43 is distanced away from the electromagnetic solenoid 45. As shown in FIG. 4, the swinging member 36 thus swings around the rotation shaft 35. The stop 39 is in this manner forced to move to the lowest position, namely an inoperative position, from the operating position. When the tip end of the arm 38 touches the bottom plate of the main enclosure 12, the swinging member 36 stops swinging. As long as electric current is sufficiently supplied to the coil 45b, the stop 39 is kept at the inoperative position.

Figure 5:
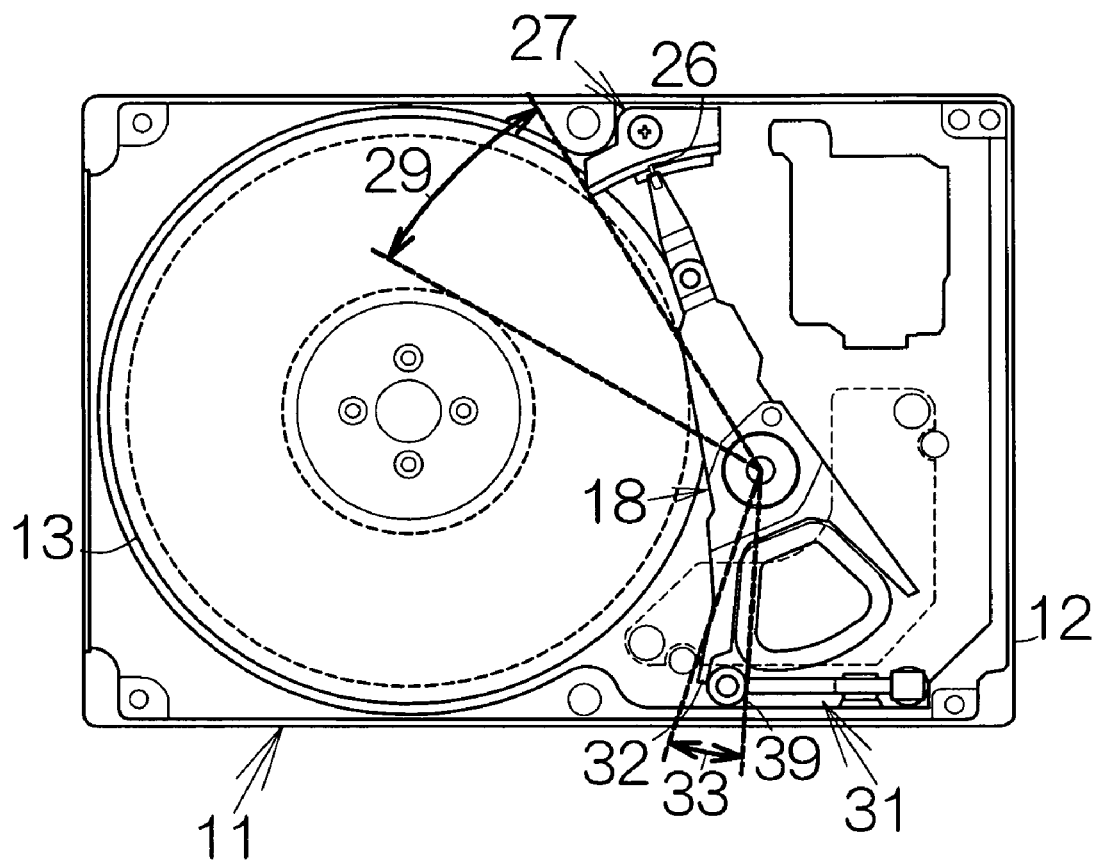
FIG. 5 is a plan view of the hard disk drive for illustrating the stop receiving the movement of a collision piece on the head actuator within a first swinging range.

As shown in FIG. 5, the load tab 26 is kept on the ramp member 27 in the hard disk drive 11 at rest. The permanent magnet 44 generates a magnetic field establishing an attraction to keep the stop 39 at the operating position. When the head actuator 18 swings over the first swinging range 28 toward the second swinging range 29, the collision piece 32 moves over the first movable range 33 toward the second movable range 34. In this case, the collision piece 32 collides against the stop 39 before the collision piece 32 deviates from the first movable range 33. The movement of the collision piece 32 is thus restrained. The head actuator 18 is accordingly prevented from entering the second swinging range 29. The swinging movement of the head actuator 18 is in this manner restrained. The load tab 26 is thus kept on the ramp member 27. The restraint mechanism 31 functions as a restraint member according to the present invention.

Figure 6:
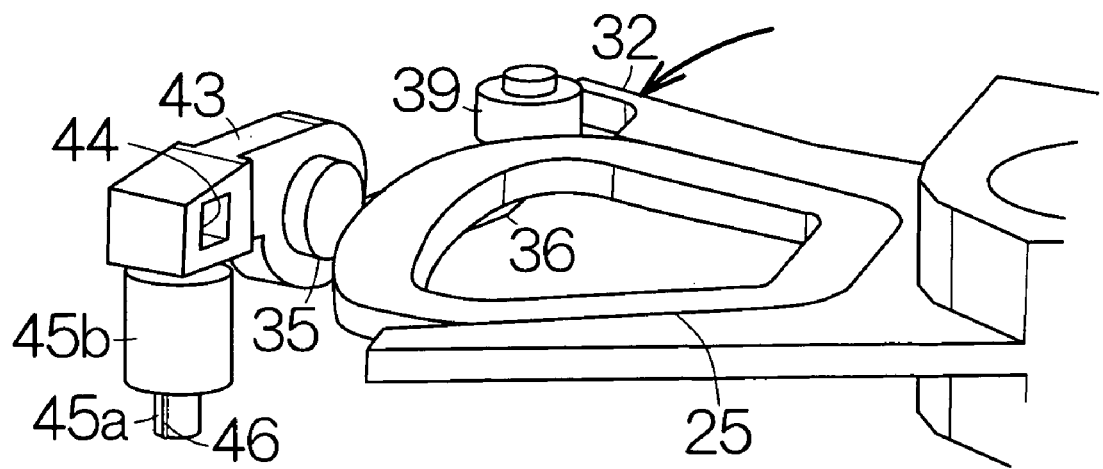
FIG. 6 is an enlarged perspective view of the restraint mechanism for illustrating the collision piece colliding against the stop within a first movable range.

As shown in FIG. 6, the collision piece 32 collides against the stop 39 in the horizontal direction, for example. The impact of the collision is received on the rotation shaft 35 through the arm 38. Since the movement path 41 of the stop 39 is established in the vertical direction as described above, no driving force is applied to the stop 39 along the movement path 41. The stop 39 is thus prevented from moving. The swinging movement of the swinging member 36 is in this manner prevented. No impact is transmitted to the electromagnetic solenoid 45. The electromagnetic solenoid 45 can sufficiently be protected from impact of collision.

Figure 7:
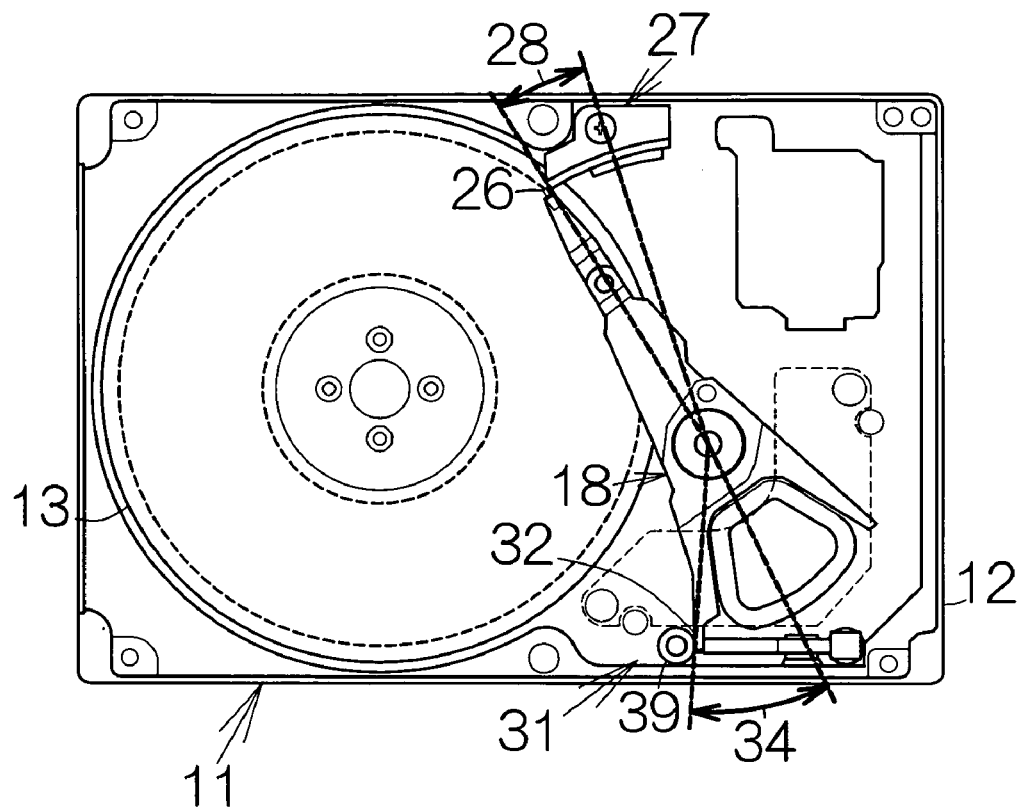
FIG. 7 is a plan view of the hard disk drive for illustrating the stop receiving the movement of the collision piece on the head actuator within a second swinging range.

Now, assume that the hard disk drive 11 starts operating. The hard disk drive 11 receives an instruction signal for starting the operation. The magnetic recording disk 13 starts rotating. Electric current is subsequently supplied to the coil 45b. The stop 39 is positioned at the inoperative position as described above. When the head actuator 18 swings toward the second swinging range 29 from the first swinging range 28, the collision piece 32 moves into the second movable range 34 from the first movable range 33. The collision piece 32 enters the second movable range 34 across the movement path 41 of the stop 39. The head actuator 18 concurrently enters the second swinging range 29. The load tab 26 takes off from the ramp member 27. As shown in FIG. 7, the flying head slider 24 keeps flying above the surface of the magnetic recording disk 13 based on the rotation of the magnetic recording disk 13. When the hard disk drive 11 confirms the separation of the load tab 26 from the ramp member 27, the supply of the electric current is terminated for the coil 45b. The attraction of the permanent magnet 44 serves to bring the stop 39 back to the operating position.

The stop 39 is kept at the operating position based on the attraction from the permanent magnet 44 during the operation of the hard disk drive 11. If the head actuator 18 is driven to swing toward the first swinging range 28 over the second swinging range 29, the collision piece 32 moves toward the first movable range 33 over the second movable range 34. In this case, the collision piece 32 collides against the stop 39 before the collision piece 32 deviates from the second movable range 34, as shown in FIG. 7. The movement of the collision piece 32 is thus restrained. The head actuator 18 thus cannot enter the first swinging range 28. The load tab 26 is prevented from contacting with the ramp member 27. Abrasion is accordingly prevented on the ramp member 27. The restraint mechanism 31 in this manner functions as a restriction member according to the present invention.

Figure 8:
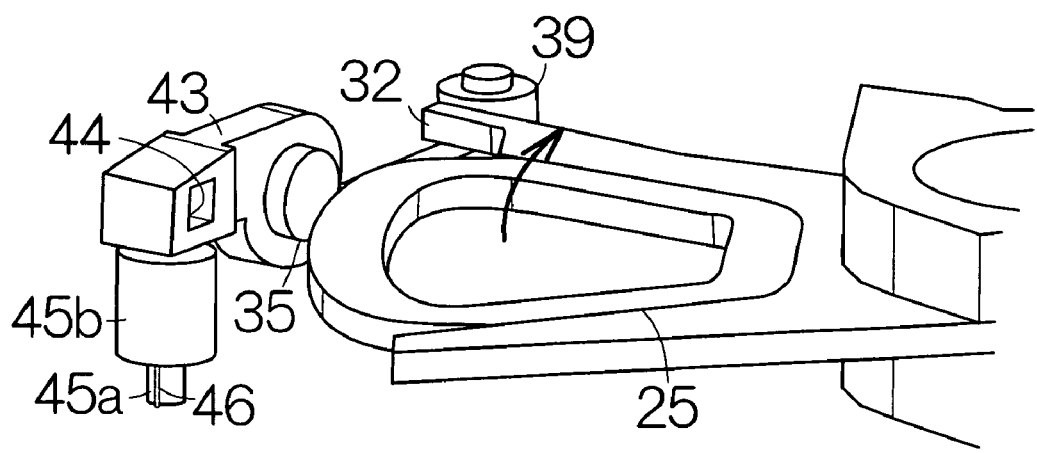
FIG. 8 is an enlarged perspective view of the restraint mechanism for illustrating the collision piece colliding against the stop within a second movable range.

As shown in FIG. 8, the collision piece 32 collides against the stop 39 in the horizontal direction in the hard disk drive 11. The impact of the collision is received on the rotation shaft 35 through the arm 38. Since the movement path 41 of the stop 39 is established in the vertical direction as described above, no driving force is applied to the stop 39 along the movement path 41. The stop 39 is thus prevented from moving. The swinging movement of the swinging member 36 is in this manner prevented. No impact is transmitted to the electromagnetic solenoid 45. The electromagnetic solenoid 45 can sufficiently be protected from impact of collision.

Now, assume that the hard disk drive 11 finishes the operation. The hard disk drive 11 receives the instruction signal for the completion of the operation. Electric current is at once supplied to the coil 45b. The stop 39 is thus positioned at the inoperative position as described above. When the head actuator 18 swings toward the first swinging range 28 from the second swinging range 29, the collision piece 32 moves toward the first movable range 33 from the second movable range 34. The collision piece 32 enters the first movable range 33 across the movement path 41 of the stop 39. The head actuator concurrently enters the first swinging range 28. The load tab 26 contacts the ramp member 27. When the load tab 26 is received on the ramp member 27, the supply of the electric current is terminated for the coil 45b. The attraction from the permanent magnet 44 serves to bring the stop 39 back to the operating position. The magnetic recording disk 13 then stops rotating.

Figure 9:
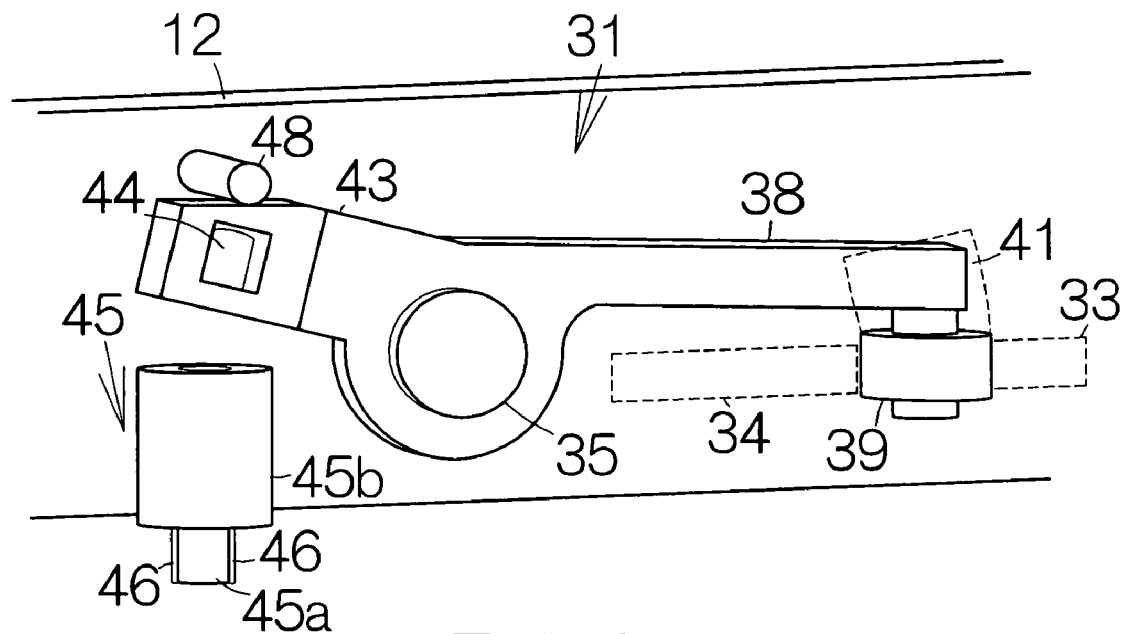
FIG. 9 is an enlarged perspective view schematically illustrating the structure of a restraint mechanism according to another example.
Figure 10:
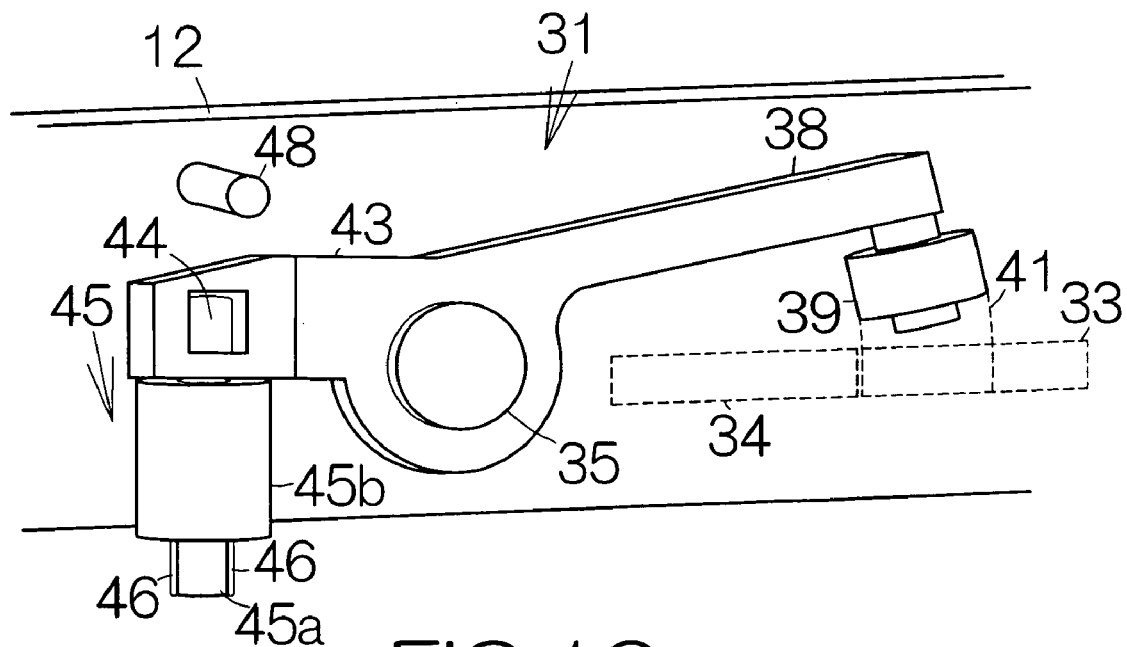
FIG. 10 is an enlarged perspective view schematically illustrating the structure of the restraint mechanism when a stop is positioned out of an operating position.

As shown in FIGS. 9 and 10, the lowest position of the stop 39 may correspond to the operating position while the highest position may correspond to the inoperative position in the restraint mechanism 31. In this case, a magnetic body or bar magnet 48 may be located at a position opposed to the permanent magnet 44. The bar magnet 48 may be fixed to the main enclosure 12. The bar magnet 48 generates a magnetic field stronger than that of the core 45a of the electromagnetic solenoid 45. Like reference numerals are attached to structure and components equivalent to those of the aforementioned embodiment.

The bar magnet 48 generates a magnetic attraction applied to the permanent magnet 44 at the intensity stronger than that of the magnetic attraction induced between the permanent magnet 44 and the core 45a. The permanent magnet 44 is thus attracted to the bar magnet 48. The driven piece 43 contacts with the bar magnet 48. The stop 39 is in this manner positioned at the lowest or operating position. The stop 39 is positioned in the first movable range 33 of the collision piece 32. In this case, the swinging movement of the head actuator 18, namely the movement of the collision piece 32 is prevented in the aforementioned manner.

On the other hand, when electric current is supplied to the coil 45b, a magnetic flux circulates through the coil 45b. The magnetic flux passes through the core 45a. Here, the different magnetic poles are established at opposed positions on the core 45a and the permanent magnet 44, so that the core 45a effects the attraction on the permanent magnet 44 at the intensity stronger than the bar magnet 48. The permanent magnet 44 is thus attracted to the core 45a. Since the core 45a is fixed to the main enclosure 12, the permanent magnet 44 namely the driven piece 43 is attracted to the electromagnetic solenoid 45. The driven piece 43 contacts with the core 45a. The stop 39 moves to the highest or inoperative position. As long as electric current is sufficiently supplied to the coil 45b, the stop 39 is kept at the inoperative position. When the supply of the electric current is stopped for the coil 45b, the stop 39 is moved to the operating position from the inoperative position based on the attraction from the permanent magnet 44.

Otherwise, a pin made of iron may be employed in place of the bar magnet 48, for example. In this case, electric current is supplied to the coil 45b in the direction opposite to the flow of electric current in the aforementioned case. When a magnetic flux is induced at the coil 45b, the same magnetic pole is established at opposed positions on the core 45a and the permanent magnet 44. The core 45a reacts against the permanent magnet 44, so that the driven piece 43 is moved toward the pin based on the attraction of the permanent magnet 44. The stop 39 is kept at the operating position. When the flow of the electric current is reversed in the coil 45b, the different magnetic poles are established at opposed positions on the core 45a and the permanent magnet 44. The core 45a generates a magnetic attraction applied to the permanent magnet 44 at the intensity stronger than that of the magnetic attraction induced between the permanent magnet 44 and the pin. The driven piece 43 is thus attracted to the core 45a based on the attraction of the permanent magnet 44. The stop 39 moves to the inoperative position from the operating position. The pin may be integral to the yoke of the voice coil motor as the power source 25, for example.

What is claimed is:

1. A recording disk drive comprising:
   a recording disk;
   a head slider related to the recording disk;
   a head actuator supporting the head slider and designed to swing around a support shaft over first and second swinging ranges adjacent each other;
   a restraint member designed to restrain swinging movement of the head actuator from separating from the first swinging range toward the second swinging range; and
   a restriction member designed to restrict the swinging movement of the head actuator from separating from the second swinging range toward the first swinging range.

2. The recording disk drive according to claim 1, wherein said head slider is held at a position outside an outermost recording track on the recording disk when the head actuator swings over the first swinging range.

3. The recording disk drive according to claim 1, wherein said head slider is held at a position inside an outer periphery of the recording disk when the head actuator swings over the second swinging range.

4. The recording disk drive according to claim 3, wherein said restraint member comprises a stop designed to move along a movement path extending in parallel with the support shaft.

5. The recording disk drive according to claim 4, wherein said restriction member comprises a stop designed to move along a movement path extending in parallel with the support shaft.

6. The recording disk drive according to claim 5, wherein said stop of the restraint member serves as the stop of the restriction member.

7. The recording disk drive according to claim 6, wherein a collision piece is fixed on the head actuator, said collision piece designed to move across the movement path of the stop when the head actuator swings.

8. The recording disk drive according to claim 7, further comprising:
   a swinging member designed to swing around a rotation shaft and having an arm member extending in a first direction from the rotation shaft, said swinging member supporting the stop at a tip end of the arm member;
   a driven piece integral to the swinging member and extending in a second direction opposite to the first direction; and
   a drive source designed to generate movement of the driven piece around the rotation shaft.

9. The recording disk drive according to claim 8, wherein a depression is formed on the arm member, said depression allowing movement of the collision piece between the stop and the rotation shaft.

10. A recording disk drive comprising:
    a recording disk;
    a ramp member located at a position outside the recording disk;
    a head slider related to the recording disk;
    a head actuator supporting the head slider and designed to swing around a support shaft from a first swinging range, where the head actuator is contacted with the ramp member, to a second swinging range, where the head actuator separates from the ramp member; and
    a restriction member designed to restrict swinging movement of the head actuator from separating from the second swinging range toward the first swinging range.

11. The recording disk drive according to claim 10, wherein said restriction member comprises a stop designed to move along a movement path extending in parallel with the support shaft.

12. The recording disk drive according to claim 11, further comprising a restraint member designed to restrain the swinging movement of the head actuator from separating from the first swinging range toward the second swinging range.

13. The recording disk drive according to claim 12, wherein said restraint member comprises a stop designed to move along a movement path extending in parallel with the support shaft.

14. The recording disk drive according to claim 13, wherein said stop of the restraint member serves as the stop of the restriction member.

15. The recording disk drive according to claim 14, wherein a collision piece is fixed on the head actuator, said collision piece designed to move across the movement path of the stop when the head actuator swings.

16. The recording disk drive according to claim 15, further comprising:

a swinging member designed to swing around a rotation shaft and having an arm member extending in a first direction from the rotation shaft, said swinging member supporting the stop at a tip end of the arm member;

a driven piece integral to the swinging member and extending in a second direction opposite to the first direction; and a drive source designed to generate movement of the driven piece around the rotation shaft.

17. The recording disk drive according to claim 16, wherein a depression is formed on the arm member, said depression allowing movement of the collision piece between the stop and the rotation shaft.

* * * * *